United States Patent
Voss et al.

(10) Patent No.: US 12,554,863 B2
(45) Date of Patent: Feb. 17, 2026

(54) PERFORMING SAST ON SECOND VERSION OF SOURCE CODE AFTER SAST HAS BEEN PERFORMED ON FIRST VERSION

(71) Applicant: MICRO FOCUS LLC, Wilmington, DE (US)

(72) Inventors: Caleb Andrew Voss, Doraville, GA (US); Trang Indie To, Santa Clara, CA (US); Franciscus Henricus Arnoldus van Buul, Montfoort (NL)

(73) Assignee: Micro Focus LLC, Wilmington, DE (US)

( * ) Notice: Subject to any disclaimer, the term of this patent is extended or adjusted under 35 U.S.C. 154(b) by 0 days.

(21) Appl. No.: 18/771,387

(22) Filed: Jul. 12, 2024

(65) Prior Publication Data

US 2025/0232040 A1   Jul. 17, 2025

Related U.S. Application Data

(63) Continuation-in-part of application No. PCT/US2024/011320, filed on Jan. 12, 2024.

(51) Int. Cl.
 *G06F 21/57* (2013.01)

(52) U.S. Cl.
 CPC ...... *G06F 21/577* (2013.01); *G06F 2221/033* (2013.01)

(58) Field of Classification Search
 CPC .............. G06F 21/577; G06F 2221/033
 USPC .......................................................... 726/25
 See application file for complete search history.

(56) References Cited

U.S. PATENT DOCUMENTS

| | | | |
|---|---|---|---|
| 7,392,545 B1 * | 6/2008 | Weber ................... | G06F 21/577 713/188 |
| 9,792,443 B1 | 10/2017 | Sheridan et al. | |
| 2007/0006147 A1 * | 1/2007 | van de Ven ......... | G06F 11/3624 717/114 |
| 2017/0169228 A1 | 6/2017 | Brucket et al. | |
| 2017/0329693 A1 * | 11/2017 | Li ........................ | G06F 11/3604 |
| 2018/0157842 A1 * | 6/2018 | Holz ..................... | G06F 16/338 |
| 2020/0371778 A1 * | 11/2020 | Ni ........................ | G06N 3/0455 |
| 2022/0405397 A1 * | 12/2022 | Golan ................... | G06F 21/57 |

(Continued)

OTHER PUBLICATIONS

Hardekopf et al. "Flow-Sensitive Pointer Analysis for Millions of Lines of Code," International Symposium on Code Generation and Optimization (CGO2011), Apr. 2011, pp. 289-298.

(Continued)

*Primary Examiner* — David P Zarka
(74) *Attorney, Agent, or Firm* — Sheridan Ross P.C.

(57) ABSTRACT

A second version of source code of a program is analyzed in relation to a first version of the source code to identify: which alarm instructions of the second version require analysis to identify second security vulnerabilities in the second version, and which first security vulnerabilities identified in the first version remain in the second version. Static application security testing (SAST) is performed on the second version in relation to the alarm instructions that have been identified as requiring analysis, to identify the second security vulnerabilities. Each second security vulnerability pertains to one of the alarm instructions. The first security vulnerabilities identified as remaining in the second version are added to the second security vulnerabilities that have been identified.

20 Claims, 12 Drawing Sheets

(56) References Cited

U.S. PATENT DOCUMENTS

| | | | |
|---|---|---|---|
| 2023/0129536 A1* | 4/2023 | Jana | G06F 8/433 |
| | | | 717/122 |
| 2023/0169164 A1* | 6/2023 | Bishop, III | G06F 21/563 |
| | | | 726/23 |
| 2023/0169177 A1 | 6/2023 | Bishop, III et al. | |
| 2024/0135030 A1* | 4/2024 | Remseth | G06F 21/6245 |
| 2025/0238521 A1* | 7/2025 | Huseynov | G06F 8/75 |
| 2025/0272083 A1* | 8/2025 | Monasterio | G06F 8/71 |

OTHER PUBLICATIONS

International Search Report and Written Opinion for International (PCT) Patent Application No. PCT/US2024/011320, dated Sep. 27, 2024, 7 pages.

Mirsky et al. "VulChecker: Graph-based Vulnerability Localization in Source Code," Proceedings of the 32nd USENIX Security Symposium, Aug. 2023, pp. 6557-6574.

\* cited by examiner

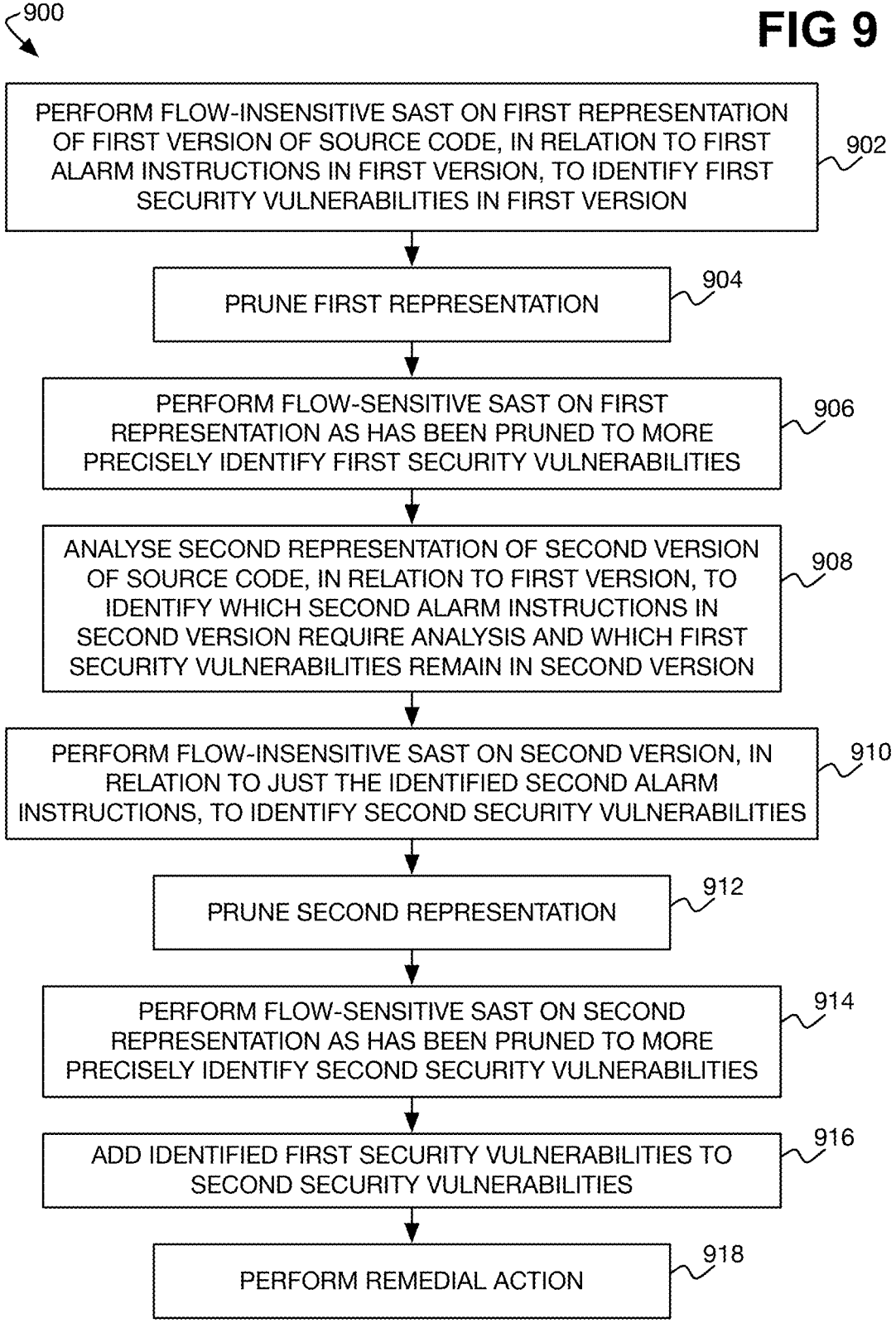

PERFORMING SAST ON SECOND VERSION OF SOURCE CODE AFTER SAST HAS BEEN PERFORMED ON FIRST VERSION

RELATED APPLICATIONS

The present patent application is a bypass continuation-in-part (CIP) of pending PCT patent application filed on Jan. 12, 2024, assigned application no. PCT/US2024/11320, and which is hereby incorporated by reference.

BACKGROUND

Computing devices like desktops, laptops, and other types of computers, as well as mobile computing devices like smartphones, among other types of computing devices, run software, which can be referred to as applications, to perform intended functionality. An application may be a so-called native application that runs on a computing device directly, or may be a web application or "app" at least partially run on a remote computing device accessible over a network, such as via a web browser running on a local computing device. An application can be tested, or analyzed, in a variety of different ways to ensure that the application correctly performs its intended functionality as well as to ensure that the application does not have any security vulnerabilities.

BRIEF DESCRIPTION OF THE DRAWINGS

FIG. 9 is a diagram of a flowchart of a method for identifying security vulnerabilities in a first version of source code via SAST, and then identifying security vulnerabilities in a second version of the source code via SAST based on an analysis of the second version in relation to the first version.

DETAILED DESCRIPTION

Figure 1:
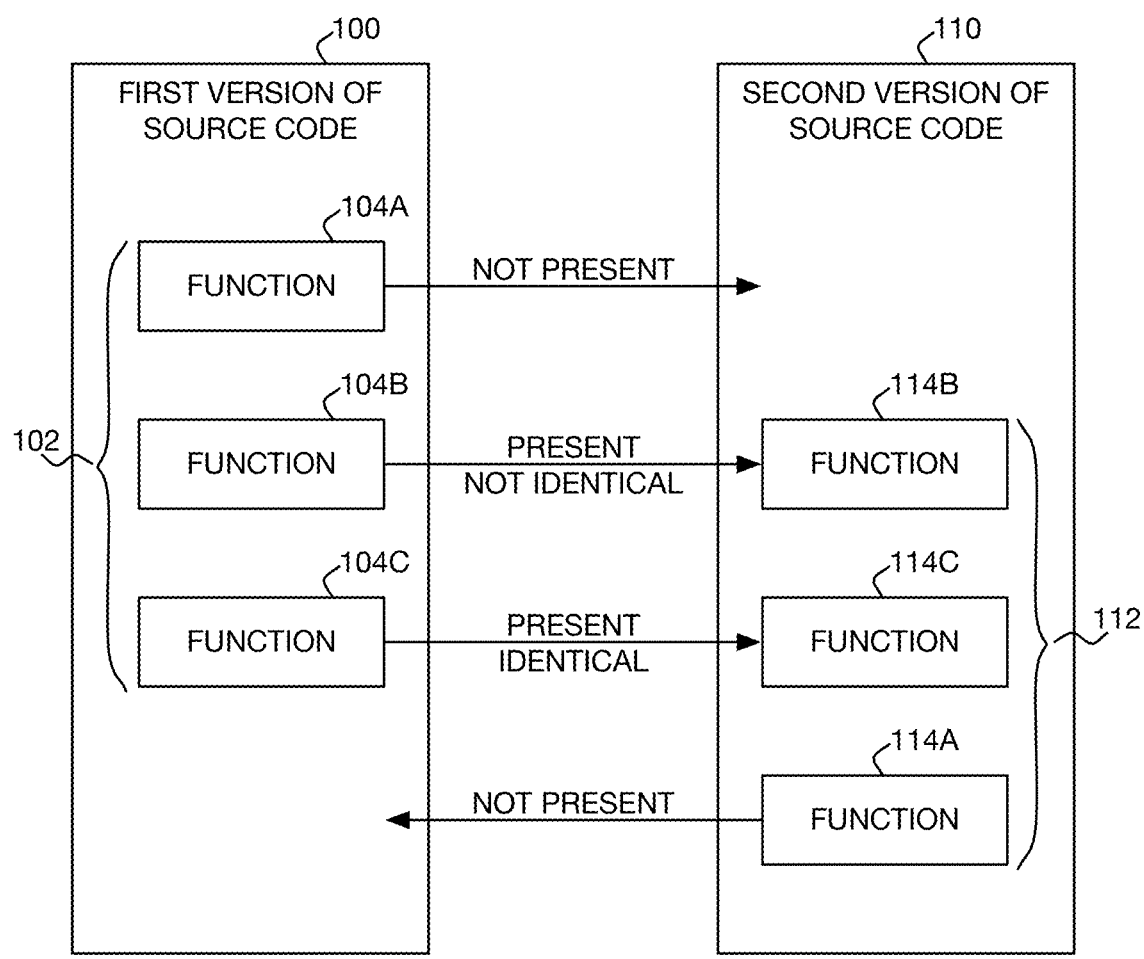
FIG. 1 is a diagram of example first and second versions of source code of a program.

As noted in the background, an application can be tested to ensure that it performs its intended functionality as well as to ensure that it does not have any security vulnerabilities. One type of application testing that is performed particularly to identify security vulnerabilities is known as static application security testing (SAST). SAST involves analyzing the source code of an application to determine whether, upon generation of executable code from the source code, subsequent execution of the application will have security vulnerabilities. SAST is static in that the application is not actually executed (i.e., executable code for the application is not generated from the source code and/or is not executed) to identify security vulnerabilities. In other words, SAST utilizes only the source code of an application and does not consider the application when it is actually running.

Other, non-SAST techniques include, among others, dynamic application security testing (DAST) and interactive application security testing (IAST). DAST identifies security vulnerabilities within an application as the application is running (i.e., during execution of the executable code for the application), such as in a production environment in which the application is being used by end users. Unlike SAST, DAST utilizes only the executable code of the application and considers the application when it is actually running. IAST identifies security vulnerabilities within an application during automated or human-assisted testing of the application while the application is running, and can identify the source code responsible for identified security vulnerabilities. Unlike SAST and like DAST, IAST utilizes the executable code of the application and considers the application when it is actually running, but unlike DAST can reference the source code of the application.

SAST can involve generating a representation of the source code of a program (e.g., a semantic representation of all possible behaviors, or paths, through the source code), and then analyzing that representation to identify security vulnerabilities in the source code, instead of (or in addition to) directly analyzing the source code itself. For instance, pending US patent application filed on Oct. 31, 2023, and assigned application Ser. No. 18/498,961, which is hereby incorporated by reference, describes examples of such representations, including a generalized lower level representation that is not specific to any programming language. Furthermore, static dataflow analyses may be performed as part of the SAST by applying a superlattice (i.e., a lattice product) of lattices corresponding to different individual static analyses against such a representation of source code, as described in pending US patent application filed on Aug. 28, 2023, and assigned application Ser. No. 18/239,011, which is also hereby incorporated by reference.

A difficulty with SAST is that its execution time can increase at least cubically with source code length when performing SAST on source code (e.g., on a representation of the source code) that is sensitive to the direction of the flow of information through the program (i.e., flow-sensitive SAST). The techniques described in the PCT/US2024/11320 application referenced above ameliorate these issues, by pruning the source code of a program to remove lines that definitively do not contribute to security vulnerabilities in the source code. In particular, flow-insensitive SAST is performed on a representation of source code (e.g., such as one or more of the representations described in the Ser. No. 18/498,961 application reference above). The flow-insensitive SAST may be performed using the same or similar static dataflow analyses (e.g., those described in the Ser. No. 18/239,011 application referenced above) used when later performing flow-sensitive SAST.

The flow-insensitive SAST is flow-insensitive in that it does not take into account the order in which fields of objects and variables of the source code have values loaded therefrom and stored therein in the source code, together with the fact that the value loaded from a field or variable is the value most recently stored in that field or variable. The flow-insensitive SAST identifies security vulnerabilities that include all the security vulnerabilities that flow-sensitive SAST would identify, but which may also include security vulnerabilities that do not actually occur in the source code. That is, the flow-insensitive SAST may identify false positives, but does not identify false negatives. Therefore, lines of source code that do not contribute to any security vulnerability identified by the flow-insensitive SAST are known to not contribute to any security vulnerability that would be identified by flow-sensitive SAST.

These lines that do not contribute to any security vulnerability identified by the flow-insensitive SAST are removed, and flow-sensitive SAST is then performed on the resulting pruned representation of the source code (i.e., from which the lines in question have been removed). The flow-sensitive SAST more precisely identifies security vulnerabilities, and specifically identifies just a subset of the vulnerabilities identified by the flow-insensitive SAST. The vulnerabilities identified by the flow-insensitive SAST but not by the flow-sensitive SAST are necessarily false positives (i.e., non-actual vulnerabilities).

Reducing the size of the source code representation makes the flow-sensitive SAST more practicable to perform in terms of computation time. As noted above, flow-sensitive SAST is performed in at least cubic time. Therefore, reducing the size of the representation of source code by removing, say, 10%, 20%, or even more of the lines can significantly reduce execution time. The reduction in execution time can be sufficiently significant that flow-sensitive SAST may be able to be performed where previously it was not able to be performed in any practicable manner.

Performing flow-insensitive SAST increases in execution time only linearly with source code size (i.e., the number of lines of source code). As such, performing flow-insensitive SAST is likely to be practicable when flow-sensitive SAST is not. Even when flow-sensitive SAST is practicable, performing flow-insensitive SAST first to prune the source code representation on which flow-sensitive SAST is then performed can result in significantly reduced execution time. The time cost to first perform flow-insensitive SAST is more than made up for by the time savings that result from just having to perform flow-insensitive SAST on a pruned version of the source code representation instead of the representation in its entirety.

The software development process is usually iterative. For instance, once an initial version of source code of an application or other program has been developed, SAST may be performed—such as via the techniques described in the PCT/US2024/11320 application as referenced above—to identify security vulnerabilities in the source code. The source code may then be modified, both to attempt to resolve the security vulnerabilities as well as for other reasons. For instance, non-security issues (e.g., bugs) may also be addressed, and additional and improved functionality may be added. SAST may then be performed on the resultantly modified version of the source code to identify any security vulnerabilities that remain or any new security vulnerabilities that have been introduced.

Techniques described herein provide for ways in which SAST can be performed on a second version of source code of a program based on an analysis of the second version in relation to a first version of the source code in which SAST was previously performed and/or in which security vulnerabilities were otherwise previously identified. By performing SAST on the second version of the source code based on an analysis of the second version in relation to the first version, the techniques can decrease execution time as compared to performing SAST on the second version without consideration of SAST performed on the first version and/or the security vulnerabilities that were otherwise previously identified in the first version. By leveraging the prior performance of SAST on the first version and/or the security vulnerabilities previously identified in the first version, SAST can be performed on the second version more quickly while still accurately identifying security vulnerabilities.

For example, an initial (first) version of source code of a program may be subjected to SAST or security vulnerabilities may otherwise be identified, and then the source code modified to attempt to resolve these vulnerabilities as well as for other reasons, as noted above. SAST can then be performed on the resultantly modified (second) version of the source code based on an analysis of this latter (second) version to the prior (first) version in which security vulnerabilities were previously identified. Security vulnerabilities in the newer (second) version of the source code can thus be identified more quickly. The SAST performed on the updated (second) version of the source code may be of the same or different type of SAST that was previously performed on the prior (first) version, if SAST was in fact performed on that (first) version.

The techniques described herein therefore provide for SAST in a way that reflects how software is usually developed, in an iterative manner. Rather than SAST being performed on a version of source code of a program in consideration of that version in isolation, SAST can be performed on a version of source code in consideration of SAST that has already been performed on a prior version of the source code. Performance of SAST on a later version of source code is accordingly simplified by leveraging the SAST that was performed on an earlier version of the source code, thereby decreasing execution time in performing SAST on the later version. This in turn can mean that SAST is more likely to be performed more frequently in the software development process, such as on more versions of the source code (e.g., some or all minor versions in addition to just major versions), which itself may shorten the software development process by identifying security vulnerabilities earlier in the process.

FIG. 1 illustratively depicts example first and second versions 100 and 110 of source code of the same application or other program. For example, the first version 100 of source code may be initially developed, and then subsequently modified to realize the second version 110 of the source code. In this case, the first version 100 constitutes the source code in a state at an earlier time, and the second version 110 constitutes the source code in a state at a later time. However, in other examples, the second version 110 may be initially developed and then subsequently modified to realize the first version 100, or the first and second versions 100 and 110 may be developed independently and/or in parallel, such as when both versions 100 and 110 are forked versions of the same underlying, earlier version of the source code.

The source code in each version 100 and 110 includes lines of instructions in a computer programming language. Depending on the programming language, the source code may have to be compiled before a computing device can execute the program, or a computing device may be able to execute the program without prior compilation, such as in the case of the interpretable programming languages. The lines of instructions are organized over functions, which may also be referred to as subprograms, procedures, methods, routines, or subroutines, and are discrete callable units. The program is executed beginning at its main function, which can call other functions that themselves can call one another. Each function has an associated name that is unique within the source code, and can specify input parameters by which a calling function passes information to the function (if any), as well as the output value that the function returns to the calling function (if any).

The first version 100 of the source code specifically includes functions 102, and the second version 110 similarly includes functions 112. In the depicted example, there are three functions 102 and three functions 112. Specifically, the functions 102 in the first version 100 include functions 104A, 104B, and 104C, and the functions 112 in the second version 110 include functions 114A, 114B, and 114C.

The function 104A in the first version 100 is not present in the second version 110. The function 104A is not present in the second version 110 of the source code in that there is no function 112 in the second version 110 having the name associated with the function 104A in the first version 110. For example, in the case in which the second version 110 of the source code is a modified version of the first version 100, the function 104A may have been deleted. While in the depicted example there is one function 104A that is not present in the second version 110, more generally there may be no functions 104A present in the first version 100 that are not present in second version 110, or there may be more than one such function 104A.

The function 114A in the second version 110 is similarly not present in the first version 100. That is, there is no function 102 in the first version 100 of the source code that has the name associated with the function 114A in the second version 110. For example, in the case in which the second version 110 of the source code is a modified version of the first version 100, the function 114A may have been added. While in the depicted example there is one function 114A that is not present in the first version 100, more generally there may be no functions 114A present in the second version 110 that are not present in second version 100, or there may be more than one such function 114A.

The function 104B in the first version 100 of the source code is present in the second version 110 as the function 114B. This means that the name associated with the function 104B in the first version 100 is the same as the name associated with the function 114B in the second version 110. However, the functions 104B and 114B are not identical. This means that the functions 104B and 114B do not identically include the same lines of instructions. For example, in the case in which the second version 110 of the source code is a modified version of the first version 100, one or more lines of instructions may have been changed, deleted, or added. While in the depicted example there is one pair of functions 104B and 114B that have the same name but that are not identical, more generally there may be no such pair of functions 104B and 114B, or more than one such pair of functions 104B and 114B.

The function 104C in the first version 100 of the source code is also present in the second version 110, as the function 114C. Therefore, the name associated with the function 104C in the first version 100 is the same as the name associated with the function 114C in the second version 110. The functions 104C and 114C are further identical. This means that the functions 104C and 114C identically include the same lines of instructions. That is, every line in the function 104C is identically included in the function 114C, and every line in the function 114C is identically included in the function 104C. While in the depicted example there is one pair of functions 104C and 114C that have the same name and that are identical, more generally there may be no such pair of functions 104C and 114C, or more than one such pair.

Figure 2:
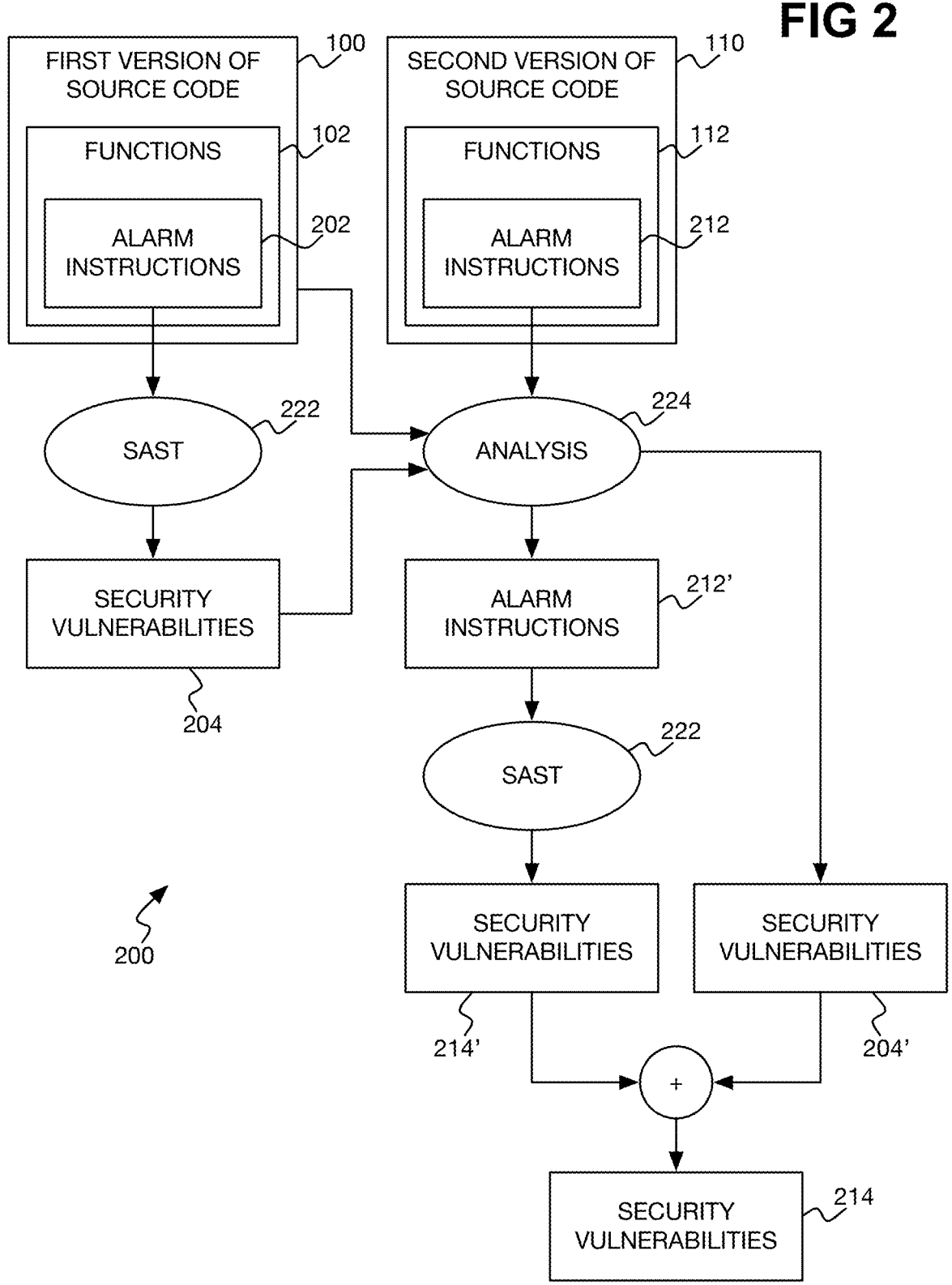
FIG. 2 is a diagram of an example process for identifying security vulnerabilities in a first version of source code via static analysis security testing (SAST), and then identifying security vulnerabilities in a second version of the source code via SAST based on an analysis of the second version in relation to the first version.

FIG. 2 illustratively depicts an example process 200 for respectively identifying security vulnerabilities 204 and 214 in the first and second versions 100 and 110 of the source code of the program. As has been described, the first version 110 includes functions 102 and the second version 110 includes functions 112. The first version 100 further includes alarm instructions 202 in its functions 102, and the second version 110 likewise includes alarm instructions 212 in its functions 112; what alarm instructions 202 and 212 is described in the next paragraph. Each alarm instruction 202/212 is located in a corresponding function 102/112. Each function 102/112 can include more than one alarm instruction 202/212, or may include no alarm instructions 202/212.

Each alarm instruction 202 in the first version 100 of the source code specifies an alarm condition that when evaluated as true during SAST 222 indicates there is a corresponding security vulnerability 204 in the first version 100. Stated another way, each security vulnerability 204 pertains to a corresponding alarm instruction 202 that was evaluated as true when SAST 222 was performed on the first version 100. In the example process 200, SAST 222 is performed on the first version 100 in relation to all the alarm instructions 202 to identify the security vulnerabilities 204 in the first version 100. Furthermore, in the example process 200, SAST 222 is performed on the first version 100 before it is performed on the second version 110. The security vulnerabilities 204 may be referred to as first security vulnerabilities in that they are security vulnerabilities in the first version 100.

The SAST 222 thus identifies which alarm instructions 202 have had their alarm conditions evaluated as true, and further identifies the functions 102 that resulted in the alarm conditions being evaluated as true. That is, for each alarm instruction 202 that has had its alarm condition evaluated as true and accordingly resulted in a corresponding security vulnerability 204, the SAST 222 identifies the functions 102 which caused the alarm condition being evaluated as true. The functions 102 that resulted in the alarm condition of an alarm instruction 202 being evaluated as true include the function 102 in which the alarm instruction 202 is present and may also include other functions 102 that resulted in the alarm condition being evaluated as true (i.e., other than the function 102 in which the alarm instruction 202 is present).

The SAST 222 that is performed on the first version 100 may be that which is described in the PCT/US2024/11320 application referenced above, which identifies which alarm instructions 202 have had their alarm conditions evaluated as true and which functions 102 caused these alarm conditions to be evaluated as true. If a different type of SAST 222 or another analysis is instead used to identify the security vulnerabilities 204, it has to be able to identify which alarm instructions 202 have had their alarm conditions evaluated as true and which functions 102 were responsible.

Each alarm instruction 212 in the second version 110 similarly specifies an alarm condition that when evaluated as true during SAST 222 indicates there is a corresponding security vulnerability 214 (more specifically, a corresponding security vulnerability 214') in the second version 110. However, SAST 222 is not necessarily performed on the second version 110 of the source code in relation to all the alarm instructions 212 to identify the security vulnerabilities 204 in the second version. Rather, SAST 222 is performed on the second version 110 in relation to the alarm instructions 212'. Each alarm instruction 212' is an alarm instruction 212. However, there can be alarm instructions 212 that are not alarm instructions 212'. SAST 222 is performed on the second version 110 in relation to the alarm instructions 212' to identify a set of security vulnerabilities 214' in the second version 110, which are included in the set of security vulnerabilities 214 in the second version 110. The security vulnerabilities 214 and 214' may be referred to as second security vulnerabilities in that they are in the second version 110.

The SAST 222 that is performed on the second version 110 may be that which is described in the PCT/US2024/11320 application referenced above reference above, and thus may be the same SAST 222 that is performed on the first version 100. However, the SAST 222 performed on the second version 110 may instead be different than that performed on the first version 100. The identification of the security vulnerabilities 214' includes which alarm instructions 212' have had their alarm conditions evaluated as true, as well as the functions 112 that were responsible for the alarm conditions being evaluated as true.

The security vulnerabilities 214, in addition to including any security vulnerabilities 214' identified by performing SAST 222 on the second version 110 in relation to the alarm instructions 212', also can include security vulnerabilities 204'. The security vulnerabilities 204' are a subset of or equal to the security vulnerabilities 204 that have been identified in the first version 100 of the source code. The security vulnerabilities 204' are specifically the security vulnerabilities 204 in the first version 100 that remain in (i.e., that are also in) the second version 110 of the source code. The security vulnerabilities 204' are not identified by performing SAST 222 on the second version 110, however. The security vulnerabilities 204' are added to the security vulnerabilities 214' identified by performing SAST 222 on the second version 110, to yield the security vulnerabilities 214 in the second version 110.

Analysis 224 is performed on the second version 110 of the source code in relation to the first version 100 on which SAST 222 (or other analysis) has already been performed or in which the security vulnerabilities 204 have otherwise already been identified. The analysis 224 identifies the security vulnerabilities 204'. That is, the analysis 224 identifies which, if any, of the security vulnerabilities 204 identified in the first version 100 remain in the second version 110. The analysis 224 is not SAST 222. More generally, the analysis 224 is not any type of direct security testing of the lines of instructions of the second version 110. For instance, the analysis 224 cannot identify any security vulnerabilities 214' pertaining to alarm instructions 212' in the second version 110. Rather, the analysis 224 is a comparison of the second version 110 to the first version 100.

The analysis 224 performed on the second version 110 of the source code in relation to the first version 100, however, also identifies the alarm instructions 212' that do require analysis in order to identify the security vulnerabilities 214 in the second version 110 (specifically, the security vulnerabilities 214'). That is, the analysis 224 identifies in relation to which of the alarm instructions 212 SAST 222 has to be performed on the second version 110 in order to identify the security vulnerabilities 214'. Because these identified alarm instructions 212' may not include all the alarm instructions 212 in the second version 110, this means that SAST 222 can be performed on the second version 110 more quickly than if SAST 222 were performed in relation to all the alarm instructions 212.

The analysis 224 of the second version 110 of the source code in relation to the first version 110 in general includes a comparison of the second version 110 to the first version 100 at a function level. The comparison identifies which functions 102 in the first version 100 are not present in the second version 110, and which functions 112 in the second version 110 are not present in the first version 100. The comparison identifies which functions 102 in the first version 100 are present in the second version 110 but not identically; that is, the comparison identifies functions 102 and 112 that have the same name but that are not identical to one another. The comparison identifies which functions 102 in the first version 100 are identically present in the second version 110; that is, the comparison identifies functions 102 and 112 that have the same name and that are identical to one another.

Based on the identification of such functions 102 and 112 (i.e., based on the results of the comparison of the second version 110 to the first version 110 at a function level), the security vulnerabilities 204' and the alarm instructions 212' are identified in the analysis 224. That is, based on the comparison results, those of the security vulnerabilities 204 in the first version 100 that remain in the second version 110 are identified (as the security vulnerabilities 204'), without having to perform SAST 222 on the second version 110. Further, based on the comparison results, which alarm instructions 212 in relation to which SAST 222 has to be performed on the second version 110 are identified (as the alarm instructions 212'). SAST 222 is still performed on all the functions 112 of the source code, but only in relation to the alarm instructions 212'.

To perform the comparison, the analysis 224 can include, for instance, delineating each function 102 in the first version 100 of the source code by name, and likewise delineating each function 112 in the second version 110. The names of the functions 102 can be compared to the names of the functions 112 to identify which functions 102 are not in the second version 110, which functions 112 are not in the first version 100, and which functions 102 in the first version 100 are also in the second version 110 (as identically named functions 112). Then, for each function 102 in the first version 100 that is also in the second version 110 as an identically named function 112, whether the function 102 is identical to that function 112 is determined.

For instance, the number of lines of instructions in each of the functions 102 and 112 having the same name can be determined. If the number of lines in the function 102 is different than the number of lines in the function 112, then the functions 102 and 112 may be deemed as not being identical. However, if the number of lines in the function 102 is the same as the number of lines in the function 112, then the functions 102 and 112 may be compared to one another on a line-by-line basis from their first lines to their last lines. If at any point corresponding lines in the functions 102 and 112 are not identical, then the line-by-line comparison can stop and the functions 102 and 112 deemed as not being identical. The functions 102 and 112 in this example are deemed identical only when the line-by-line comparison of the functions 102 and 112 is completed without identifying any corresponding lines that are different from each other.

Figure 3:
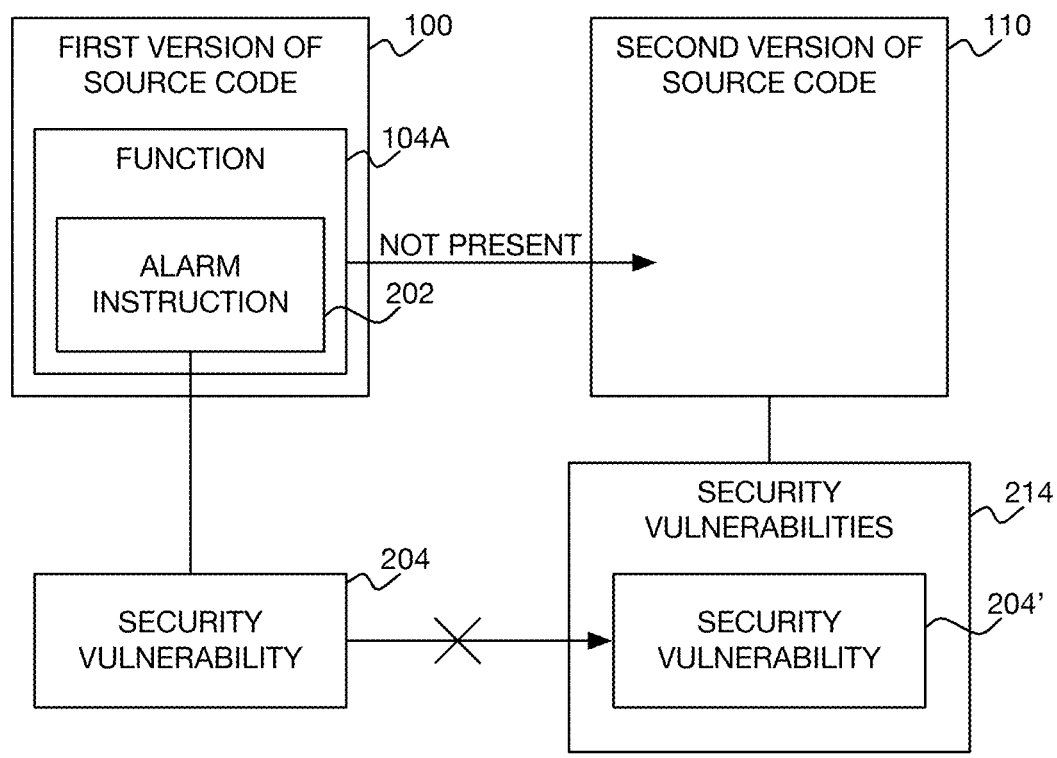
FIG. 3 is a diagram of an example analysis of a second version of source code in relation to a first version of the source code when a function is present in the first version but is not present in the second version.

FIG. 3 shows an example of the analysis 224 of the second version 110 of the source code in relation to the first version 100 with respect to the function 104A in the first version 100 that is not present in the second version 110. In this case, if the function 104A includes an alarm instruction 202, and if there is a security vulnerability 204 in the first version 100 pertaining to (i.e., that has been identified because of) the alarm instruction 202, this security vulnerability 204 is not identified as one that remains in the second version 110. That is, the security vulnerability 204 is identified as not being a security vulnerability 204', and thus not one of the security vulnerabilities 214 in the second version 110.

Figure 4:
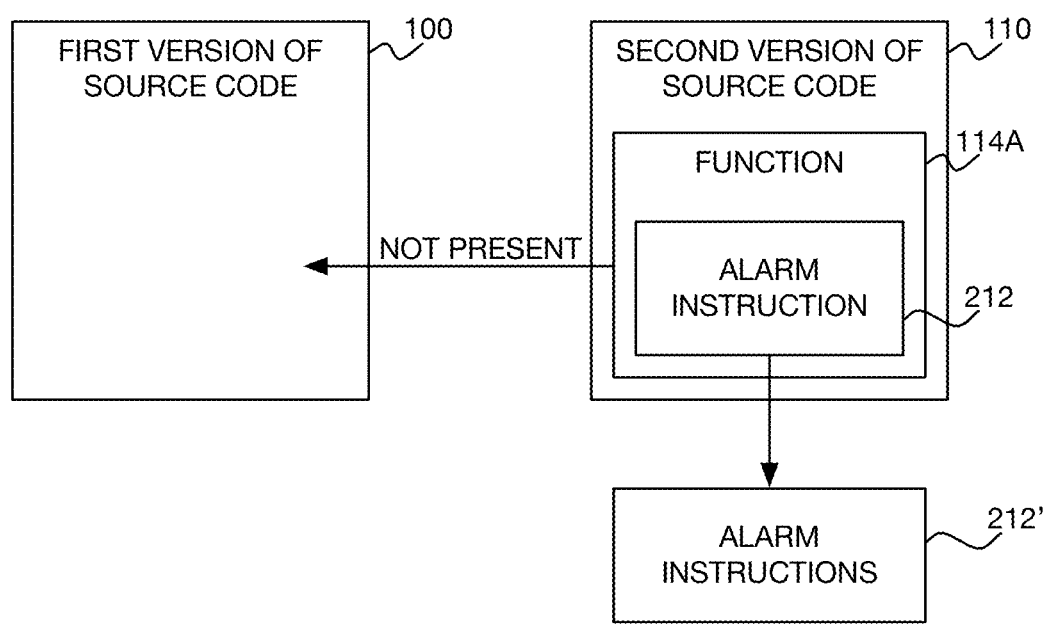
FIG. 4 is a diagram of an example analysis of a second version of source code in relation to a first version of the source code when a function is present in the second version but is not present in the first version.

FIG. 4 shows an example of the analysis 224 of the second version 110 of the source code in relation to the first version 100 with respect to the function 114A in the second version that is not present in the first version 100. In this case, if the function 114A includes an alarm instruction 212, then the alarm instruction 212 is identified as requiring analysis in order to the identify the security vulnerabilities 214 (specifically the security vulnerabilities 214') in the second version 110. That is, the alarm instruction 212 is identified as being one of the alarm instructions 212' in relation to which SAST 222 has to be performed on the second version 110.

Figure 5:
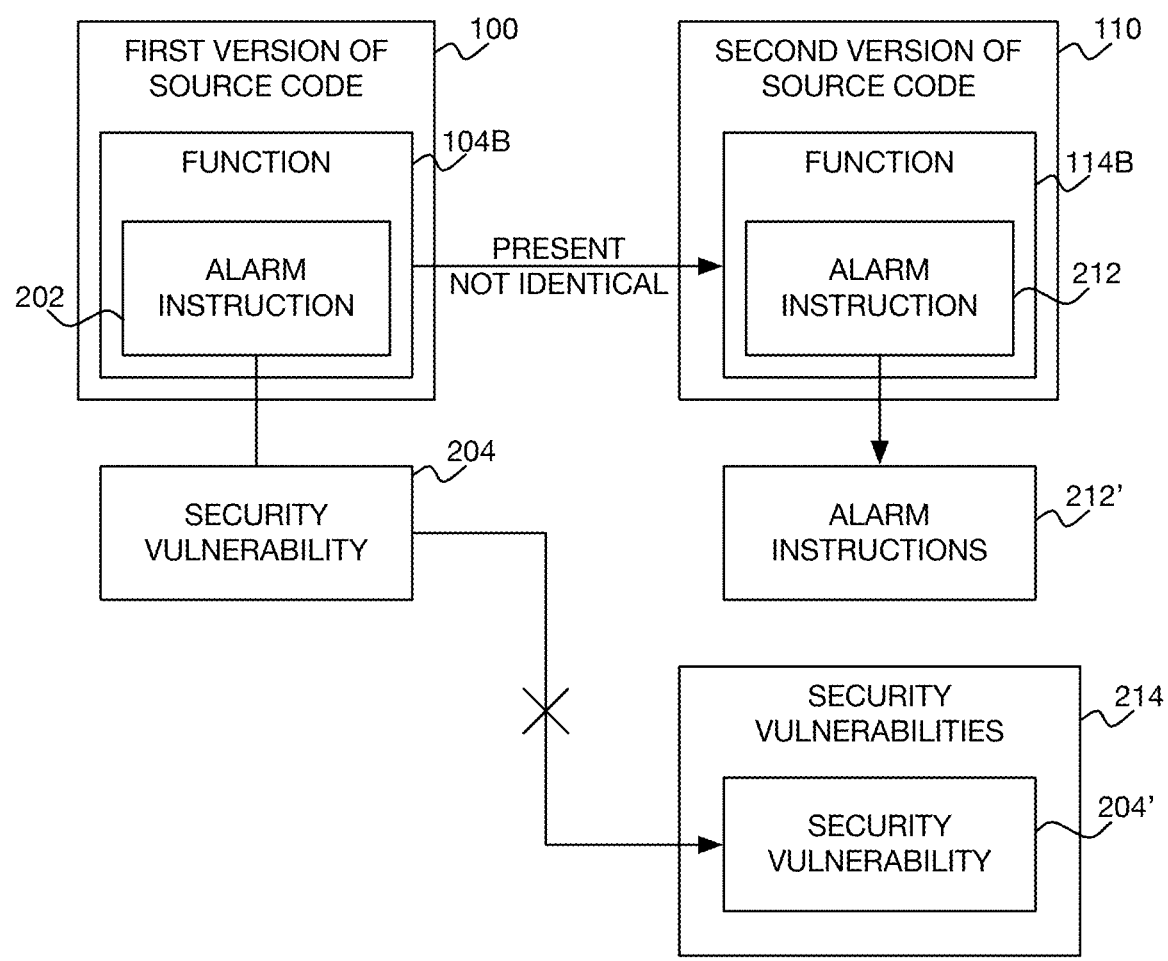
FIG. 5 is a diagram of an example analysis of a second version of source code in relation to a first version of the source code when a function is present in both the first and second versions but is not identical in both versions.

FIG. 5 shows an example of the analysis 224 of the second version 110 of the source code in relation to the first version 100 with respect to a function 104B in the first version 100 that is present in the second version 110 as a corresponding function 114B, but where the functions 104B and 114B are not identical. In this case, if there is a security vulnerability 204 in the first version 100 pertaining to the alarm instruction 202, this security vulnerability 204 is not identified as one that remains in the second version 110, and therefore is identified as not being a security vulnerability 204' and thus not one of the security vulnerabilities 214 in the second version 110. Furthermore, in the case of FIG. 5, if the function 114B includes an alarm instruction 212, the alarm instruction 212 is identified as one of the alarm instructions 212' requiring analysis and thus in relation to which SAST 222 has to be performed on the second version 110.

Figure 6A:
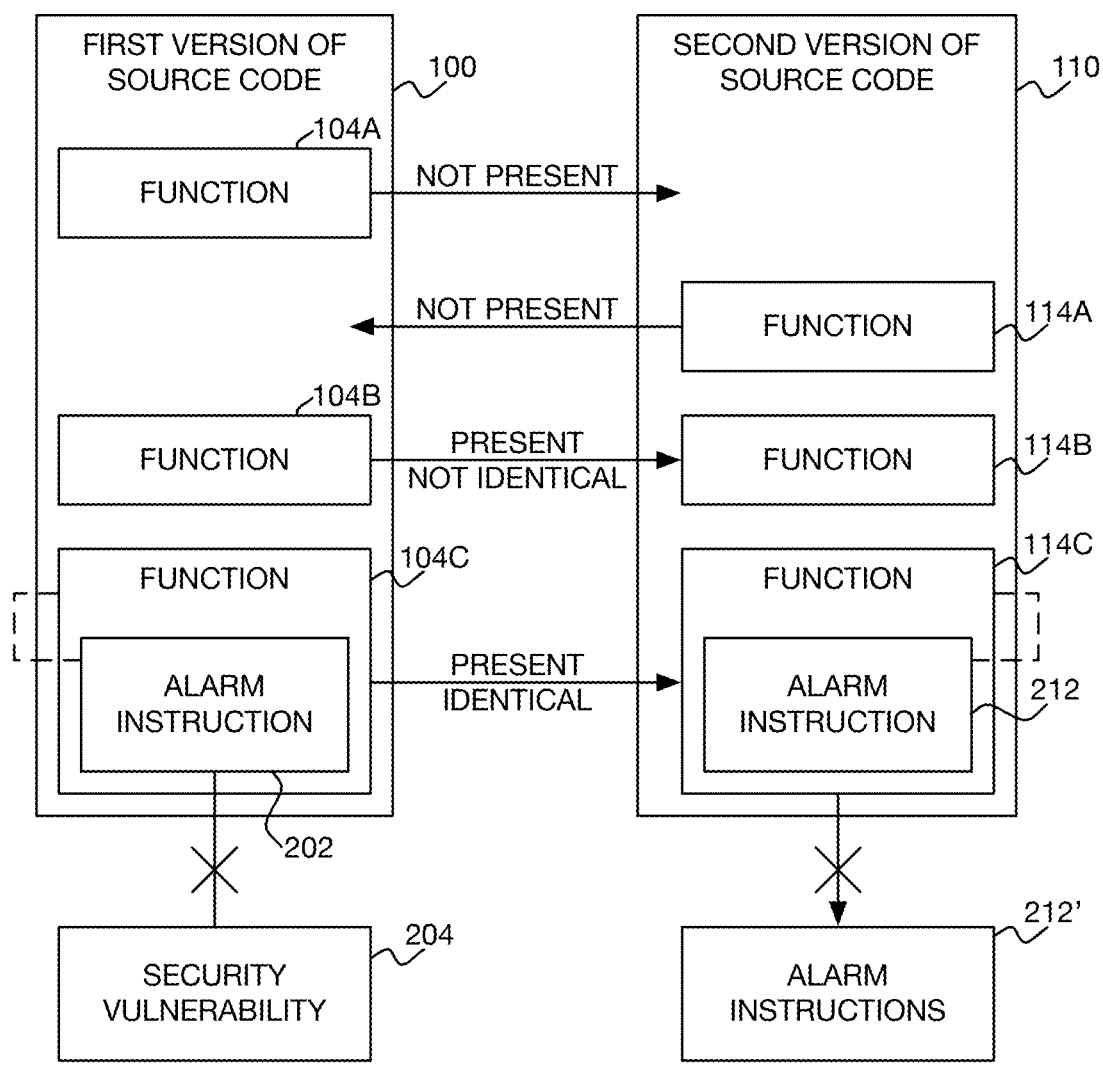
FIGS. 6A, 6B, 6C, and 6D are diagrams of an example analysis of a second version of source code in relation to a first version of the source code when a function is present in both the first and second versions and is identical in both versions.
Figure 6B:
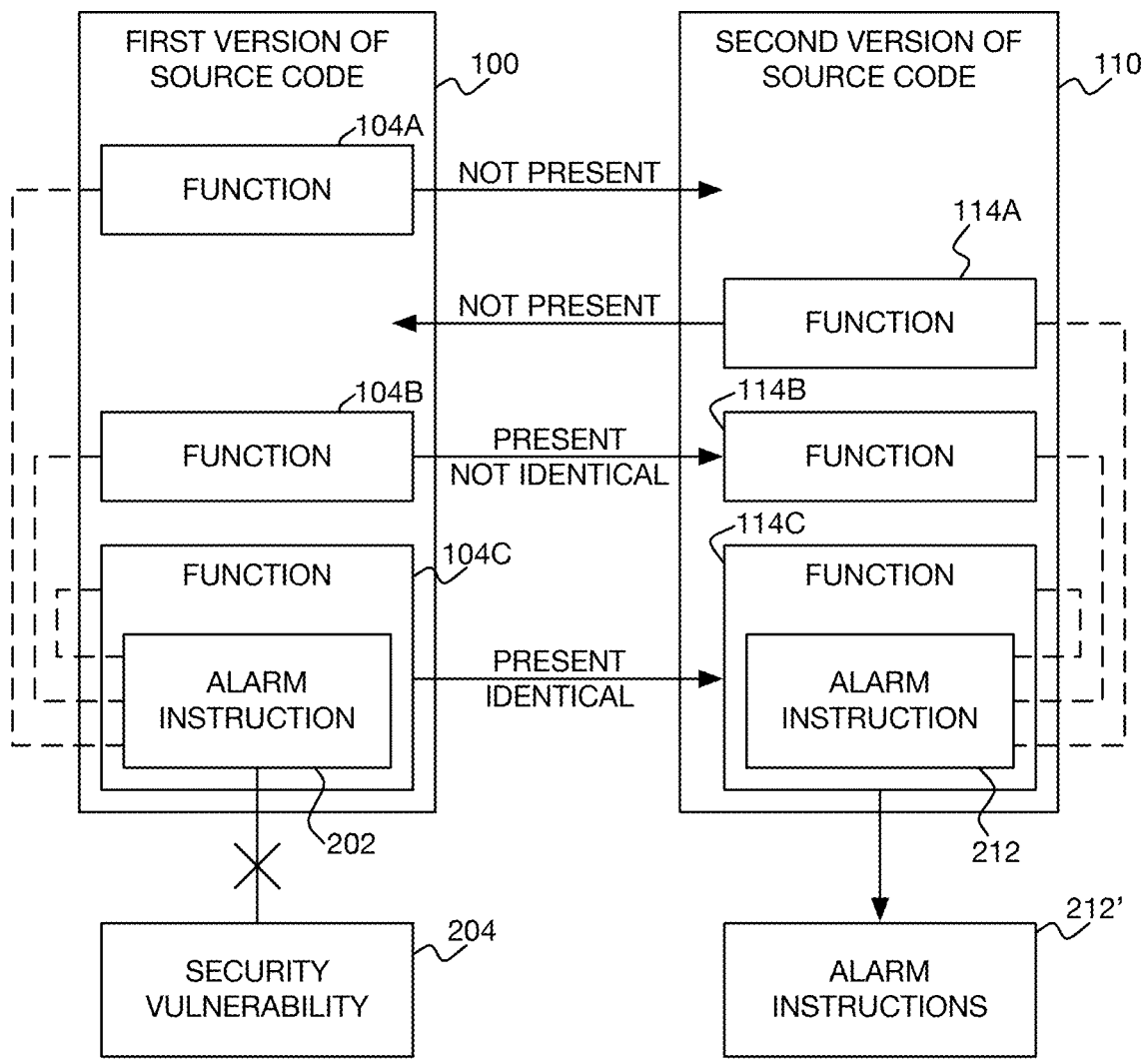

FIGS. 6A, 6B, 6C, and 6D show an example of the analysis 224 of the second version 110 of the source code in relation to the first version 100 with respect to a function 104C in the first version 100 that is present in the second version 110 as a corresponding function 114C, where the functions 104C and 114C are identical. FIGS. 6A and 6B both pertain to the case in which the function 104C includes an alarm instruction 202, and therefore in which the function 114C includes a corresponding instruction 212 since the functions 104C and 114C are identical, but in which there is no security vulnerability 204 in the first version 100 pertaining to the alarm instruction 202.

FIG. 6A specifically pertains to the case in which the alarm instruction 202 depends on the function 104C including the alarm instruction 202 (and potentially any other function 104C identically present in the second version as a corresponding function 114C), as indicated by a dashed line in the figure. That is, the alarm instruction 202 depends on a function 104C in that in order to determine whether the alarm condition evaluates to true, it is necessary to analyze the function 104C. The set of all such functions 104C that alarm instruction 202 depends on may be determined by performing SAST 222 or some other analysis on the first version of the program 100.

(The alarm instruction 212 likewise depends on the corresponding set of functions 114C in the second version of the program 110. The set of functions 114C that alarm instruction 212 depends on may be determined by performing the analysis 224 that is simpler than SAST 222 on the second version of the program 110.)

Therefore, if the alarm condition in the alarm instruction 202 had been evaluated as true, the resulting security vulnerability 204 would have been due to the functions 104C. Stated another way, whether SAST 222 identifies a security vulnerability 204 corresponding to the alarm instruction 202 depends only on the function 104C including the alarm instruction 202 (or any other function 104C identically present in the second version 110 as a corresponding function 114C). Such identification does not, in other words, depend on a function 104A not present in the second version 110 or on a function 104B that is not identical to its corresponding function 114B in the second version 110.

Furthermore, were the alarm instruction 212 to be evaluated as true, any resulting security vulnerability would have been due only to the function or functions 114C that are identically present in the first version 100 as corresponding functions 104C. That is, the identification of any security vulnerability that would result from alarm instruction 212 does not depend on a function 114A not present in the first version 100 or on a function 114B that is not identical to its corresponding function 104B in the first version 100.

In the case of FIG. 6A, the alarm instruction 212 in the second version 110 is identified as not requiring analysis and not resulting in a security vulnerability. This because the corresponding alarm instruction 202 in the first version 100 did not result in a security vulnerability 204, and because the alarm instruction 212 depends only on functions 114C that are identically present in the first version 100. There thus cannot be a security vulnerability 214 in the second version 110 pertaining to the corresponding alarm instruction 212. The alarm instruction 212 is therefore not identified as one of the alarm instructions 212' in relation to which SAST 222 is performed on the second version 110.

FIG. 6B specifically pertains to the alarm instruction 202 depending on a function 104A in the first version 100 that is not present in the second version 110, and/or on a function 104B in the first version 100 that is present in the second version 110 but as a corresponding function 114B that is not identical to the function 104B. The alarm instruction 202 also depends on the function 104C including the alarm instruction 202. The foregoing is indicated by dashed lines in the figure.

The alarm instruction 202 depends on such a function 104A and/or 104B (in addition to the function 104C that includes the instruction 202) in that if the alarm condition in the alarm instruction 202 had been evaluated as true, the resulting security vulnerability 204 would have been due to that function 104A and/or 104B. Stated another way, whether SAST 202 identifies a security vulnerability 204 corresponding to the alarm instruction 202 depends on such a function 104A and/or 104B.

In the case of FIG. 6B, the alarm instruction 212 in the second version 110 is identified as requiring analysis, since there still may be a security vulnerability 214 in the second version 110 pertaining to the alarm instruction 212. This is because the security vulnerability 214 may be evaluated as true due to the function 114B that is different than its corresponding function 104B in the first version 100, or due to a function 114A that is not present in the first version 100. The alarm instruction 212 is therefore identified as one of the alarm instructions 212' in relation to which SAST 222 is performed on the second version 110.

Figure 6C:
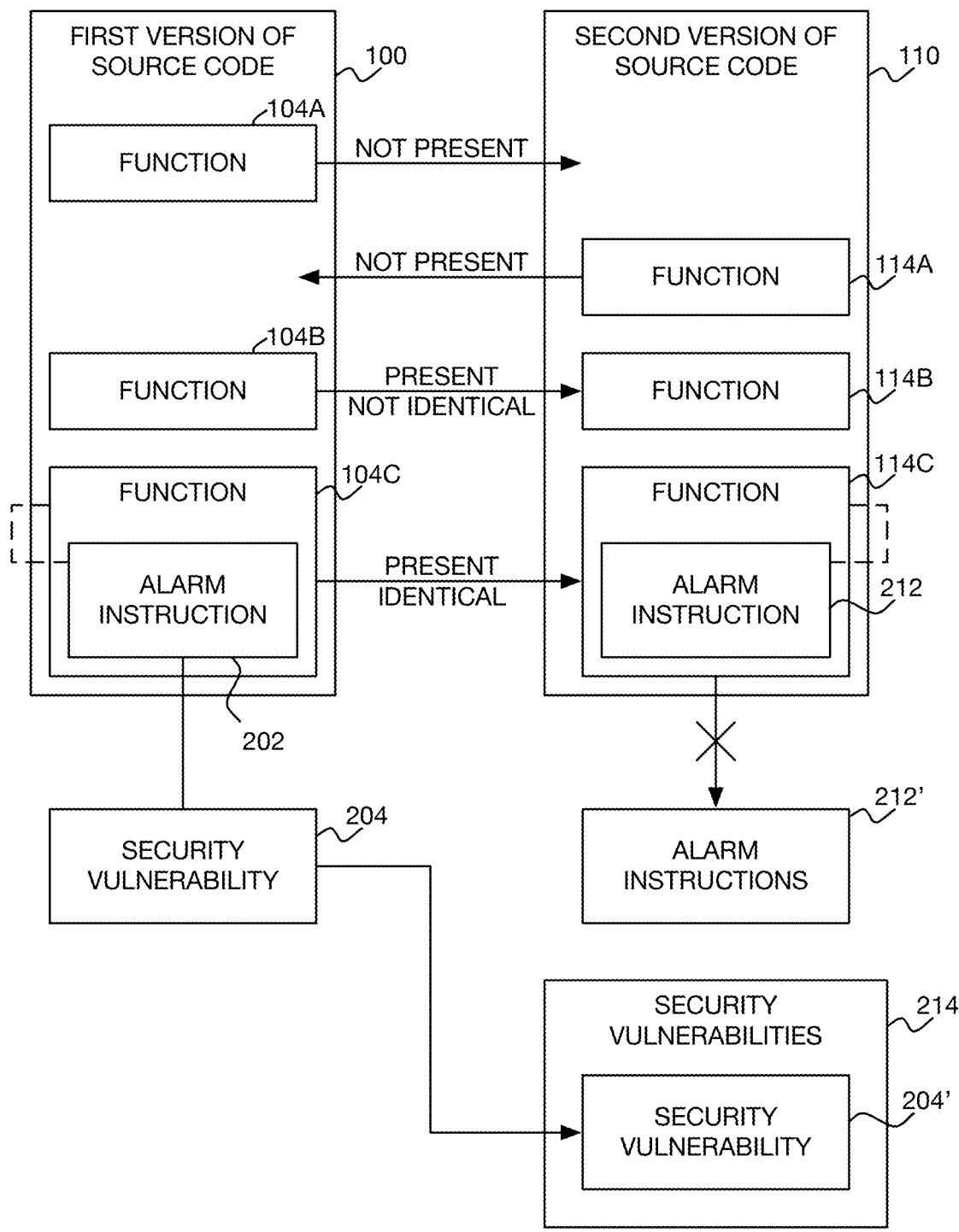
Figure 6D:
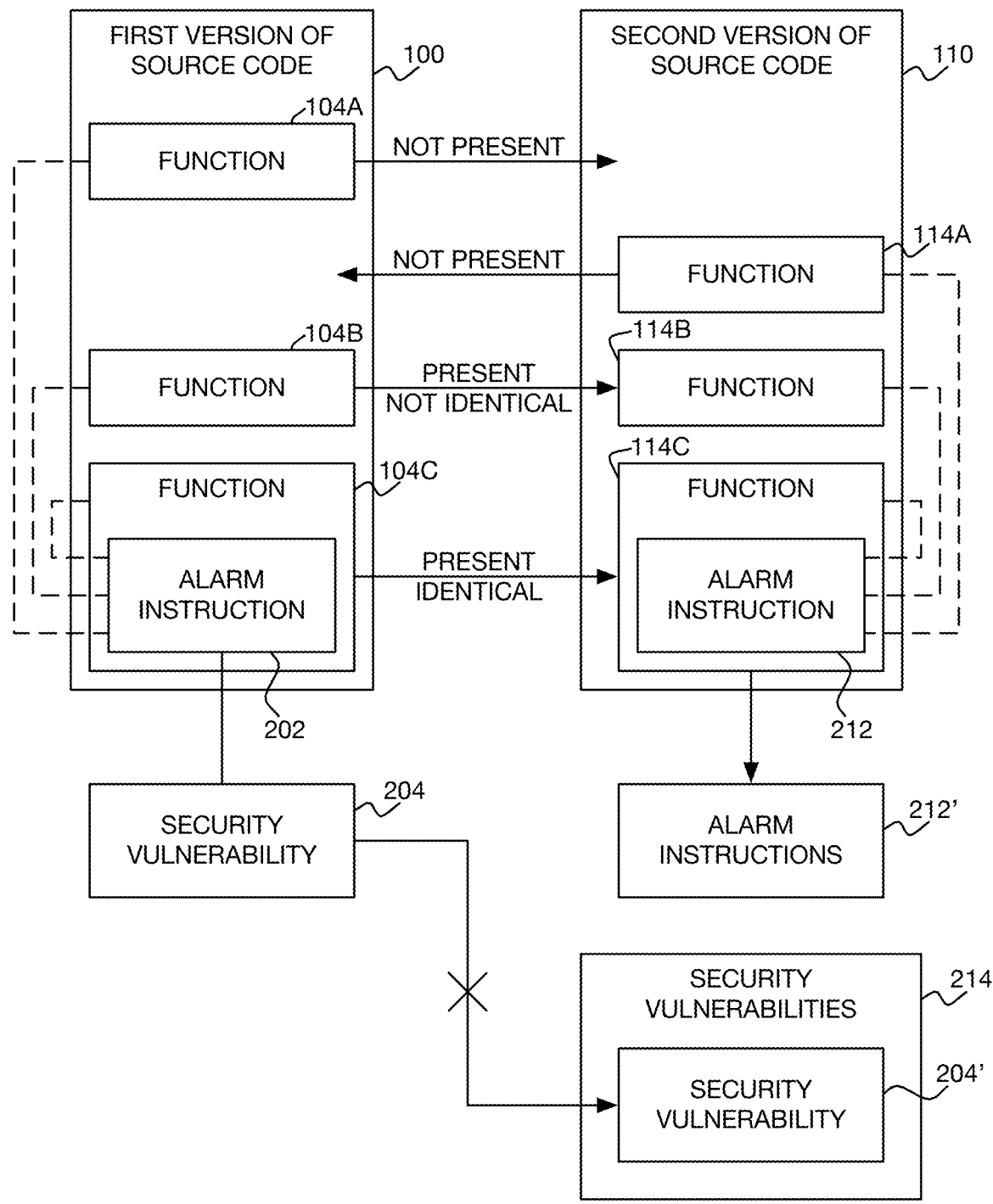

FIGS. 6C and 6D both pertain to the case in which the function 104C includes an alarm instruction 202, and thus in which the function 114C includes a corresponding alarm instruction 212, but in which there is a security vulnerability 204 in the first version 100 pertaining to the alarm instruction 202. FIG. 6C specifically pertains to the case in which the alarm instruction 202 depends on the function 104C including the alarm instruction 202 (and potentially any other function 104C identically present in the second version as a corresponding function 114C). FIG. 6C thus is similar to the case of FIG. 6A, but a security vulnerability 204 is identified in the case of FIG. 6C, whereas a vulnerability 204 was not identified in the case of FIG. 6A.

In FIG. 6C, then, evaluation of the lines of source code of the function 104C including the alarm instruction 202, or another function 104C identically present in the second version as a corresponding function 114C, is what caused the alarm condition of the alarm instruction 202 to be evaluated as true during SAST 222. This is as opposed to evaluation of the lines of source code of a function 104A that is not present in the second version 110, or evaluation of the lines of source code of a function 104B that is not identically present in the second version 110, having caused the alarm condition of the alarm instruction 202 to be evaluated as true during SAST 222.

In this case, since the functions 104C are identically present in the second version 110 as the functions 114C, the security vulnerability 204 is identified as one that remains in the second version 110, and thus identified as a security vulnerability 204' of the security vulnerabilities 214 in the second version 110. The corresponding alarm instruction 212 in the function 114C in the second version 110 is therefore identified as not being one of the alarm instructions 212' that require analysis and in relation to which SAST 222 is performed on the second version 110.

Since SAST 222 is not performed on the second version 110 in relation to the alarm instruction 212, execution time in performing the SAST 222 on the second version 110 is accordingly reduced, such that identification of the security vulnerabilities 214 in the second version 110 occurs more quickly. SAST 222 does not have to be performed in relation to the alarm instruction 212 since its evaluation during SAST 222 would identify the security vulnerability 204' that has already been identified in the first version 100 as the security vulnerability 204.

FIG. 6D, by comparison, specifically pertains to the alarm instruction 202 being evaluated as true and thus triggering the security vulnerability 204 as a result of evaluation of a function 104A in the first version 100 that is not present in the second version 110, and/or as a result of evaluation of a function 104B in the first version 100 that is present in the second version 110 but as a corresponding function 114B that is not identical to the function 104B.

The alarm instruction 202 is also dependent on the functions 104C, including the function 104C that contains the instruction 202, and which are identically present in the second version 110 as the functions 114C. The foregoing is indicated by dashed lines in the figure. FIG. 6D thus is similar to the case of FIG. 6B, but a security vulnerability 204 is identified in the case of FIG. 6D, whereas a vulnerability 204 was not identified in the case of FIG. 6B.

In the case of FIG. 6D, then, the security vulnerability 204 in the first version 100 is not identified as one that necessarily remains in the second version 110, and thus is identified as not being a security vulnerability 204' included in the second vulnerabilities 214 in the second version 110. SAST 222 therefore has to be performed on the second version 110 in relation to the alarm instruction 212 in the function 114C, and accordingly the alarm instruction 212 is identified as one of the alarm instructions 212' requiring analysis.

Figure 7:
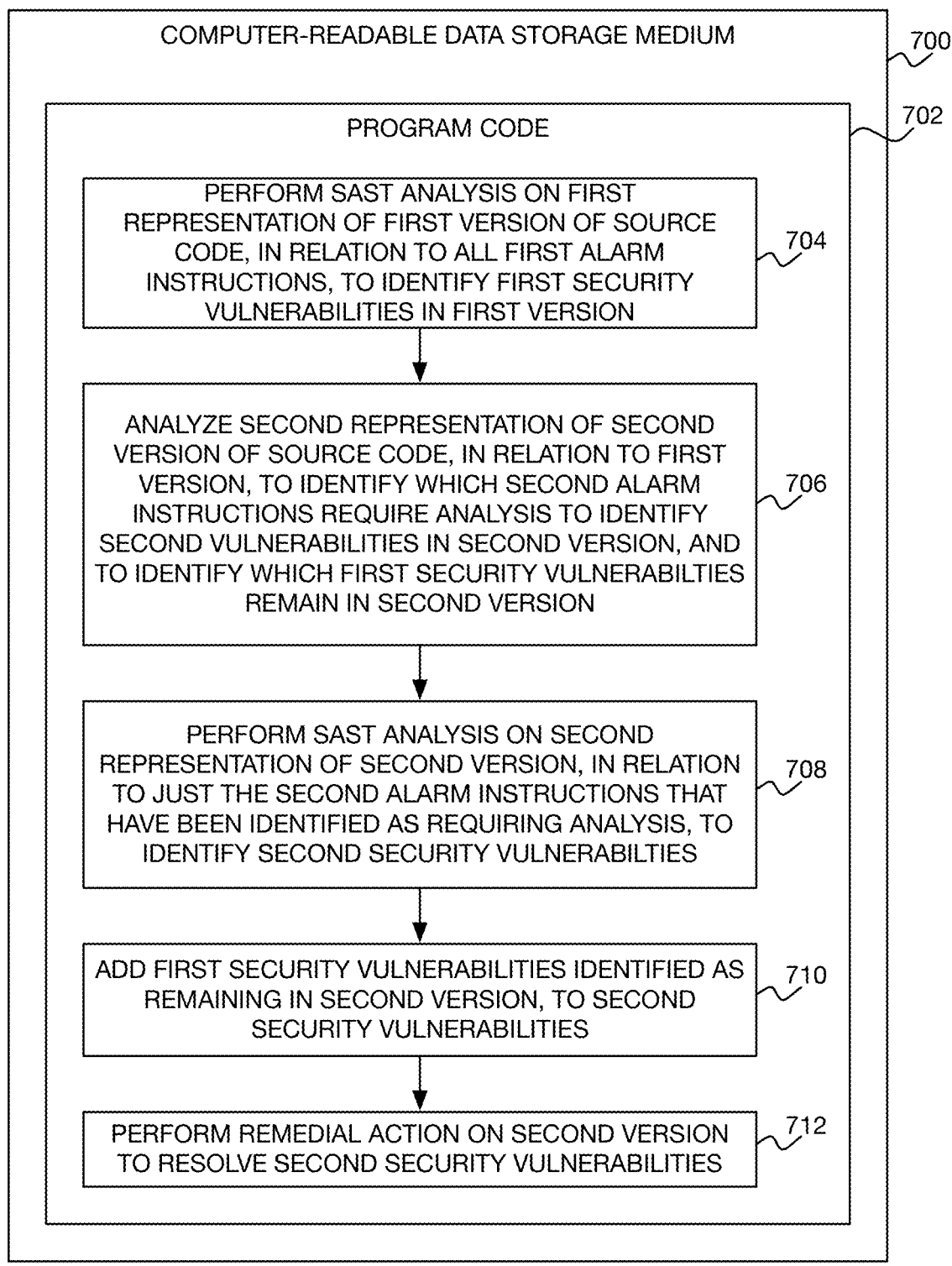
FIG. 7 is a diagram of a non-transitory computer-readable data storage medium storing program code for identifying security vulnerabilities in a first version of source code via SAST, and then identifying security vulnerabilities in a second version of the source code via SAST based on an analysis of the second version in relation to the first version.

FIG. 7 shows an example non-transitory computer-readable data storage medium 700 storing program code 702. The program code 702 is executable by a processor of a computing device to perform processing. The processing includes performing SAST 222 on a first version 100 of source code of a program, in relation to first alarm instructions 202 of the first version 100, to identify first security vulnerabilities 204 in the first version 100 (704). The SAST 222 that is performed may be that which is described in the PCT/US2024/11320 application referenced above. Each first security vulnerability 204 pertains to one of the first alarm instructions 202.

The processing includes analyzing a second version 110 of the source code in relation to the first version 100 (706). Analysis 224 of the second version 110 in relation to the first version 100 identifies which second alarm instructions 212 of the second version 100 require analysis to identify second security vulnerabilities 214 in the second version 110. That is, second alarm instructions 212' that require analysis to identify security second vulnerabilities 214' are identified. Analysis 224 of the second version 110 in relation to the first version 100 also identifies which first security vulnerabilities 204 identified in the first version 100 remain in the second version 110. That is, security vulnerabilities 204' are identified.

The processing includes performing SAST 222 on the second version 110, in relation to the second alarm instructions 212' that have been identified as requiring analysis and thus not necessarily in relation to all the second alarm instructions 212, to identify the second security vulnerabilities 214' (708). The SAST 222 that is performed on the second version 110 may be that which is described in the PCT/US2024/11320 application referenced above, and may be different than the SAST 222 or other analysis performed on the first version 100. Each second security vulnerability 214' pertains to one of the second alarm instructions 212'.

The processing includes then adding, to the second security vulnerabilities 214' that have been identified, the first security vulnerabilities 204 identified as remaining in the second version 110 (710). That is, the security vulnerabilities 204' are added to the second security vulnerabilities 214' to yield the second security vulnerabilities 214. The processing can further include performing a remedial action on (e.g., regarding) the second version 110 with respect to the source code to resolve (including at least lessening the impact of) the second security vulnerabilities 214 (712). For example, for some types of security vulnerabilities 214, the second version 110 of the source code may be automatically modified to remove the vulnerabilities 214. Therefore, ultimate execution of the program will not result in the security vulnerabilities 214 occurring.

Figure 8:
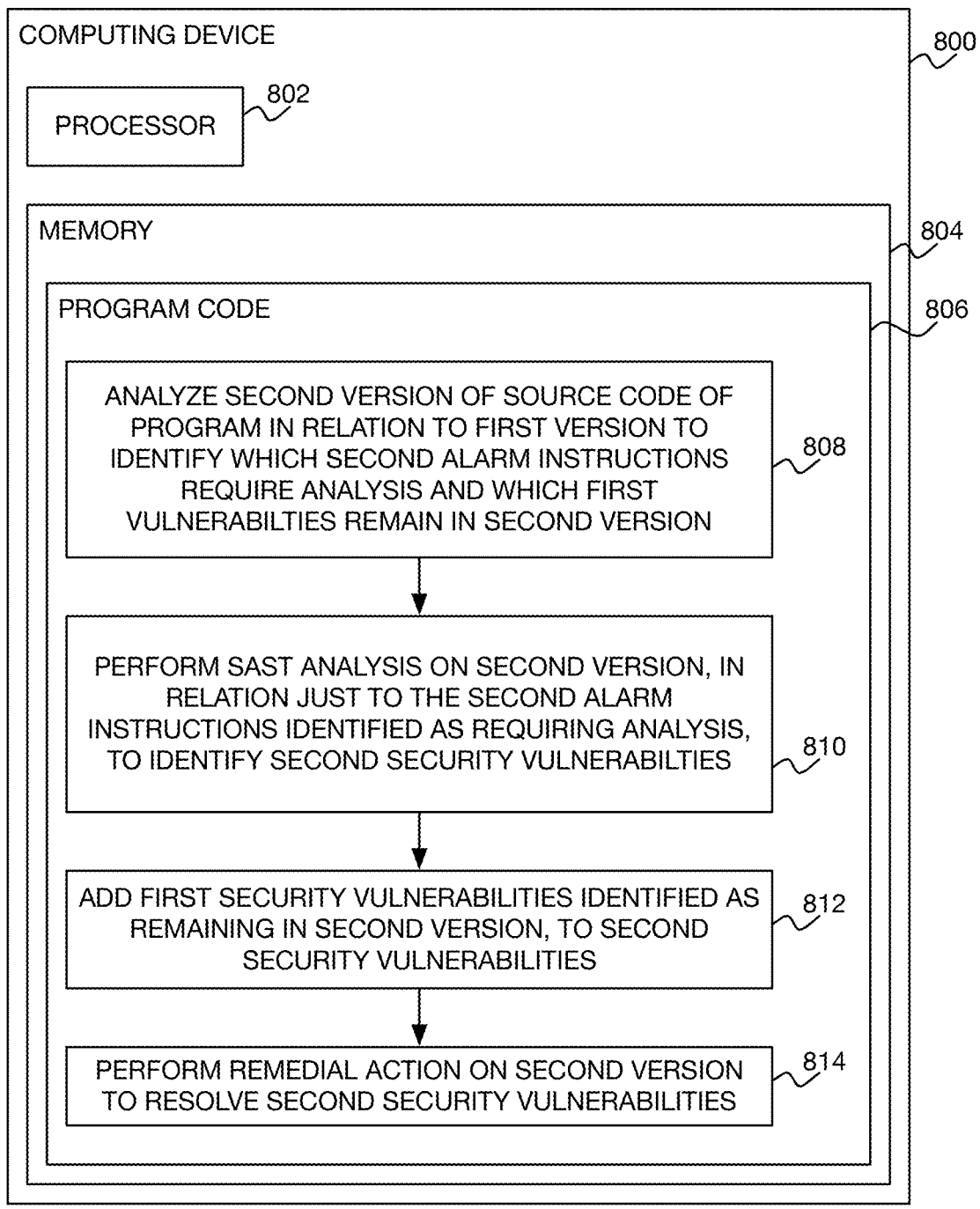
FIG. 8 is a diagram of a computing device for identifying security vulnerabilities in a second version of source code via SAST based on an analysis of the second version in relation to a first version of the source code in which security vulnerabilities were previously identified.

FIG. 8 shows an example computing device 800. The computing device 800 is more generally a computing system that can include multiple discrete computing devices. The computing device 800 includes a processor 802 and a memory 804. The memory 804 is more generally a non-transitory computer-readable data storage medium, and stores program code 806 executable by the processor 802 to perform processing.

The processing includes analyzing a second version 110 of source code of a program in relation to a first version 100 of the source code (808), as has been described in relation to (706) of FIG. 7. The processing includes performing SAST 222 on the second version 110 in relation to the alarm instructions 212' that have been identified as requiring analysis, to identify the second security vulnerabilities 214' (810).

The processing includes adding, to the second security vulnerabilities 214', the security vulnerabilities 204', which are first security vulnerabilities 204 in the first version 100 that have been identified as remaining in the second version 110 (812). The processing can further include performing a remedial action on (e.g., regarding) the second version 110 to resolve the second security vulnerabilities 214 (814).

FIG. 9 shows an example method 900. The method 900 can be implemented as program code stored on a memory or other non-transitory computer-readable medium and that is executed by a processor. The method 900 pertains to SAST as described in the PCT/US2024/11320 application referenced above. The method 900 includes performing flow-insensitive SAST on a first representation of a first version 100 of source code of a program, in relation to first alarm instructions 202 of the first version 100, to identify first security vulnerabilities 204 in the first version 100 (902).

The method 900 includes pruning the first representation to remove parts thereof that do not contribute to the first security vulnerabilities 204 identified by the flow-insensitive SAST that has been performed on the first version 100 (904). For example, any lines that do not contribute to the security vulnerabilities 204 are removed from the first representation. The method 900 includes performing flow-sensitive SAST on the pruned first representation, to more precisely identify the first security vulnerabilities 204 in the first version 100 (906).

The method 900 includes analyzing a second representation of a second version 110 of the source code in relation to the first representation of the first version 100 (908), as in (706) of FIG. 7. The method 900 includes performing flow-insensitive SAST on the second representation, in relation to the second alarm instructions 212', to identify second security vulnerabilities 214' (910).

The method 900 includes pruning the second representation to remove parts thereof that do not contribute to the second security vulnerabilities 214' identified by the flow-insensitive SAST that has been performed on the second version 110 (912). For example, any lines that do not contribute to the security vulnerabilities 214' are removed from the second representation.

The method 900 includes performing flow-sensitive SAST on the pruned second representation to more precisely identify the second security vulnerabilities 214' in the second version 110 (914). The method 900 includes adding, to the second security vulnerabilities 214' as have been more precisely identified, the first security vulnerabilities 204' in the first version 100 that have been identified as remaining in the second version 110 (916). The method 900 can further include performing a remedial action on (e.g., regarding) the second version 110 to resolve the second security vulnerabilities 214 (918).

Techniques have been described herein for identifying security vulnerabilities in a second version of source code of a program based on a first version of the source code. The security vulnerabilities in the second version are identified by performing SAST on at least some but not necessarily all of the alarm instructions of the second version, which decreases the time required to perform SAST. Security vulnerabilities in the first version identified as remaining in the first version can then be added to the security vulnerabilities that have been identified in the second version, such that they are identified without having to perform SAST on the second version.

We claim:

1. A non-transitory computer-readable data storage medium storing program code executable by a processor to perform processing comprising:
    performing static application security testing (SAST) on a first version of source code of a program, in relation to a plurality of first alarm instructions of the first version, to identify first security vulnerabilities in the first version, each first security vulnerability pertaining to one of the first alarm instructions;
    analyzing a second version of the source code, in relation to the first version, to identify:
        which of a plurality of second alarm instructions of the second version require analysis to identify second security vulnerabilities in the second version, and
        which of the first security vulnerabilities identified in the first version remain in the second version;
    performing the SAST on the second version, in relation to the second alarm instructions that have been identified as requiring analysis, to identify the second security vulnerabilities, each second security vulnerability pertaining to one of the second alarm instructions; and
    adding, to the second security vulnerabilities that have been identified, the first security vulnerabilities identified as remaining in the second version.

2. The non-transitory computer-readable data storage medium of claim 1, wherein the second alarm instructions of the second version that require analysis to identify the second security vulnerabilities are a subset of all the second alarm instructions of the second version.

3. The non-transitory computer-readable data storage medium of claim 1, wherein the processing further comprises:
    performing a remedial action regarding the second version of the source code to resolve the second security vulnerabilities.

4. The non-transitory computer-readable data storage medium of claim 1, wherein performing the SAST on the second version comprises:
    performing flow-insensitive SAST on a representation of the second version, in relation to the second alarm instructions that have been identified as requiring analysis, to identify the second security vulnerabilities, each second security vulnerability pertaining to one of the second alarm instructions;
    pruning the representation of the second version based on the flow-insensitive SAST that has been performed; and
    performing flow-sensitive SAST on the representation of the second version as has been pruned, to more precisely identify the second security vulnerabilities in the second version.

5. The non-transitory computer-readable data storage medium of claim 1, wherein analyzing the second version of the source code in relation to the first version comprises:
    identifying a function in the first version of the source code that is not present in the second version, such that no first security vulnerability pertaining to any first alarm instruction located in the function is identified as remaining in the second version.

6. The non-transitory computer-readable data storage medium of claim 1, wherein analyzing the second version of the source code in relation to the first version comprises:
identifying a function in the second version of the source code that is not present in the first version; and
identifying any second alarm instruction located in the function as requiring analysis.

7. The non-transitory computer-readable data storage medium of claim 1, wherein analyzing the second version of the source code in relation to the first version comprises:
identifying a function in the second version of the source code that is present in the first version but is not identical in the first and second versions; and
identifying any second alarm instruction located in the function in the second version as requiring analysis.

8. The non-transitory computer-readable data storage medium of claim 1, wherein analyzing the second version of the source code in relation to the first version comprises one or more of:
identifying one or more first functions in the first version of the source code that are not present in the second version;
identifying one or more second functions in the first version of the second version of the source code that are present in the first version but are not identical in the first and second versions;
identifying a third function in the first version of the source code that is present in the second version and is identical in the first and second versions;
identifying any alarm instruction located in the third function that depends on any first function in the first version or any second function in the first version, as requiring analysis; and
identifying any first security vulnerability pertaining to any first alarm instruction located in the third function that does not depend on any first function in the first version and does not depend on any second function in the first version, as remaining in the second version.

9. A method comprising:
performing, by a processor, flow-insensitive static application security testing (SAST) on a first representation of a first version of source code of a program, in relation to a plurality of first alarm instructions of the first version, to identify first security vulnerabilities in the first version, each first security vulnerability pertaining to one of the first alarm instructions;
pruning, by the processor, the first representation to remove parts thereof that do not contribute to the first security vulnerabilities identified by the flow-insensitive SAST that has been performed on the first version;
performing, by the processor, flow-sensitive SAST on the pruned first representation, to more precisely identify the first security vulnerabilities in the first version;
analyzing, by the processor, a second representation of a second version of the source code, in relation to the first representation, to identify:
which of a plurality of second alarm instructions of the second version require analysis to identify second security vulnerabilities in the second version, and
which of the first security vulnerabilities that have been more precisely identified in the first version remain in the second version;
performing, by the processor, the flow-insensitive SAST on the second representation, in relation to the second alarm instructions that have been identified as requiring analysis, to identify the second security vulnerabilities, each second security vulnerability pertaining to one of the second alarm instructions;
pruning, by the processor, the second representation to remove parts thereof that do not contribute to the second security vulnerabilities identified by the flow-insensitive SAST that has been performed on the second version;
performing, by the processor, the flow-sensitive SAST on the pruned second representation, to more precisely identify the second security vulnerabilities in the second version; and
adding, by the processor and to the second security vulnerabilities as have been more precisely identified, the first security vulnerabilities that have been more precisely identified as remaining in the second version.

10. The method of claim 9, wherein the second alarm instructions of the second version that require analysis to identify the second security vulnerabilities are a subset of all the second alarm instructions of the second version.

11. The method of claim 9, further comprising:
performing, by the processor, a remedial action regarding the second version of the source code to resolve the second security vulnerabilities.

12. The method of claim 9, wherein analyzing the second representation of the second version of the source code in relation to the first representation comprises:
identifying a function in the first version of the source code that is not present in the second version, such that no first security vulnerability pertaining to any first alarm instruction located in the function is identified as remaining in the second version.

13. The method of claim 9, wherein analyzing the second representation of the second version of the source code in relation to the first representation comprises:
identifying a function in the second version of the source code that is not present in the first version; and
identifying any second alarm instruction located in the function as requiring analysis.

14. The method of claim 9, wherein analyzing the second representation of the second version of the source code in relation to the first representation comprises:
identifying a function in the second version of the source code that is present in the first version but is not identical in the first and second versions; and
identifying any second alarm instruction located in the function in the second version as requiring analysis.

15. The method of claim 9, wherein analyzing the second representation of the second version of the source code in relation to the first representation comprises one or more of:
identifying one or more first functions in the first version of the source code that are not present in the second version;
identifying one or more second functions in the first version of the second version of the source code that are present in the first version but are not identical in the first and second versions;
identifying a third function in the first version of the source code that is present in the second version and is identical in the first and second versions;
identifying any alarm instruction located in the third function that depends on any first function in the first version or any second function in the first version, as requiring analysis; and
identifying any first security vulnerability pertaining to any first alarm instruction located in the third function that does not depend on any first function in the first version and does not depend on any second function in the first version, as remaining in the second version.

16. A computing device comprising:
a processor; and
a memory storing instructions executable by the processor to:
    analyze a second version of source code of a program, in relation to a first version of the source code, to identify:
        which of a plurality of alarm instructions of the second version require analysis to identify second security vulnerabilities in the second version, and
        which of a plurality of first security vulnerabilities identified in the first version remain in the second version;
    perform static application security testing (SAST) on the second version, in relation to the alarm instructions that have been identified as requiring analysis, to identify the second security vulnerabilities, each second security vulnerability pertaining to one of the alarm instructions; and
    add, to the second security vulnerabilities that have been identified, the first security vulnerabilities identified as remaining in the second version.

17. The computing device of claim 16, wherein the alarm instructions of the second version that require analysis to identify the second security vulnerabilities are a subset of all the alarm instructions of the second version.

18. The computing device of claim 16, wherein the instructions are executable by the processor to further:
    perform a remedial action regarding the second version of the source code to resolve the second security vulnerabilities.

19. The computing device of claim 16, wherein analysis of the second version of the source code in relation to the first version comprises:
    identification of a function in the first version of the source code that is not present in the second version, such that no first security vulnerability pertaining to any alarm instruction located in the function is identified as remaining in the second version;
    identification of any alarm instruction located in any function in the second version of the source code that is not present in the first version as requiring analysis; and
    identification of any alarm instruction located in any function in the second version that is present in the first version but is not identical in the first and second versions as requiring analysis.

20. The computing device of claim 16, wherein analysis of the second version of the source code in relation to the first version comprises one or more of:
    identification of one or more first functions in the first version of the source code that are not present in the second version;
    identification of one or more second functions in the first version of the second version of the source code that are present in the first version but are not identical in the first and second versions;
    identification of a third function in the first version of the source code that is present in the second version and is identical in the first and second versions;
    identification of any alarm instruction located in the third function that depends on any first function in the first version or any second function in the first version, as requiring analysis; and
    identification of any first security vulnerability pertaining to any alarm instruction located in the third function that does not depend on any first function in the first version and does not depend on any second function in the first version, as remaining in the second version.

* * * * *